US011498577B2

(12) United States Patent
Kamata et al.

(10) Patent No.: US 11,498,577 B2
(45) Date of Patent: Nov. 15, 2022

(54) BEHAVIOR PREDICTION DEVICE

(71) Applicant: TOYOTA JIDOSHA KABUSHIKI KAISHA, Toyota (JP)

(72) Inventors: Nobuhide Kamata, Susono (JP);
Masahiro Harada, Hadano (JP);
Tsukasa Shimizu, Nagakute (JP);
Bunyo Okumura, Nagakute (JP);
Naoki Nagasaka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 16/375,232

(22) Filed: Apr. 4, 2019

(65) Prior Publication Data

US 2019/0311272 A1   Oct. 10, 2019

(30) Foreign Application Priority Data

Apr. 5, 2018  (JP) .............................. JP2018-073209

(51) Int. Cl.
*B60W 50/00*  (2006.01)
*G06N 5/02*   (2006.01)
(Continued)

(52) U.S. Cl.
CPC ....... *B60W 50/0097* (2013.01); *G05D 1/0088* (2013.01); *G06N 5/02* (2013.01);
(Continued)

(58) Field of Classification Search
CPC ......... G05D 1/0088; G05D 2201/0213; G05D 1/027; G05D 1/0246; G05D 1/0274;
(Continued)

(56) References Cited

U.S. PATENT DOCUMENTS 8,718,861 B1 *  5/2014  Montemerlo ......... B60W 30/00
                                          701/411
8,948,955 B2    2/2015  Zhu et al.
(Continued)

FOREIGN PATENT DOCUMENTS

JP       2013-544696 A    12/2013

*Primary Examiner* — Donald J Wallace
(74) *Attorney, Agent, or Firm* — Sughrue Mion, PLLC

(57) ABSTRACT

A behavior prediction device comprising: a moving object behavior detection unit configured to detect moving object behavior, a behavior prediction model database that stores a behavior prediction model, a behavior prediction calculation unit configured to calculate a behavior prediction of the moving object using the behavior prediction model, a prediction deviation determination unit configured to determine whether a prediction deviation occurs based on the behavior prediction and a detection result of the moving object behavior corresponding to the behavior prediction, a deviation occurrence reason estimation unit configured to estimate a deviation occurrence reason when determination is made that the prediction deviation occurs, and an update necessity determination unit configured to determine a necessity of an update of the behavior prediction model database based on the deviation occurrence reason when the determination is made that the prediction deviation occurs.

18 Claims, 6 Drawing Sheets

(51) Int. Cl.
  *G05D 1/00* (2006.01)
  *G05D 1/02* (2020.01)
(52) U.S. Cl.
  CPC ............ *B60W 2050/0028* (2013.01); *B60W 2050/0083* (2013.01); *B60W 2554/00* (2020.02); *G05D 1/027* (2013.01); *G05D 1/0246* (2013.01); *G05D 2201/0213* (2013.01)
(58) Field of Classification Search
  CPC . G05D 1/0257; G05D 1/024; B60W 50/0097; B60W 2554/00; B60W 2050/0028; B60W 2050/0083; G06N 5/02; G06N 20/00
  See application file for complete search history.

(56) References Cited

U.S. PATENT DOCUMENTS

| | | | |
|---|---|---|---|
| 9,120,484 B1* | 9/2015 | Ferguson | B60W 30/08 |
| 9,381,916 B1* | 7/2016 | Zhu | G01S 13/867 |
| 10,423,847 B2* | 9/2019 | Micks | G06K 9/00355 |
| 2014/0136045 A1 | 5/2014 | Zhu et al. | |
| 2016/0292998 A1* | 10/2016 | Obuchi | G08G 1/015 |
| 2017/0043768 A1* | 2/2017 | Prokhorov | B60W 30/095 |

\* cited by examiner

BEHAVIOR PREDICTION DEVICE

TECHNICAL FIELD

The present disclosure relates to a behavior prediction device.

CROSS-REFERENCE TO RELATED APPLICATION

This application claims the benefit of priority from Japanese Patent Application No. 2018-073209, filed Apr. 5, 2018, the entire contents of which are incorporated herein by reference.

BACKGROUND

U.S. Pat. No. 8,948,955 is known as a technical document relating to a behavior prediction device in the related art. This specification discloses a system that detects an object outside a host vehicle and predicts behavior of a moving object (vehicle, motorcycle, pedestrian, or the like) using behavior data stored in a memory. This system stores a detection result of the behavior of the moving object as the behavior data to use the detection result for a next behavior prediction.

SUMMARY

However, if there is an error in the behavior data in the above-described system in the related art, the behavior prediction of the object cannot be performed correctly. Therefore, when there is the error in the behavior data, data contents are needed to be updated. In the technical field, it is desired to appropriately determine a necessity of updating data for predicting the behavior of the moving object.

In order to solve the above problems, a behavior prediction device of one aspect of the present disclosure includes a moving object behavior detection unit configured to detect moving object behavior including at least a position, an advancing direction, and a speed of a moving object around a host vehicle, a behavior prediction model database that stores a behavior prediction model for predicting the moving object behavior, a behavior prediction calculation unit configured to calculate a behavior prediction of the moving object using the behavior prediction model based on a detection result of the moving object behavior, a prediction deviation determination unit configured to determine whether a prediction deviation occurs based on the behavior prediction and the detection result of the moving object behavior corresponding to the behavior prediction, a deviation occurrence reason estimation unit configured to estimate a deviation occurrence reason based on the behavior prediction and the detection result of the moving object behavior corresponding to the behavior prediction when determination is made by the prediction deviation determination unit that the prediction deviation occurs, and an update necessity determination unit configured to determine a necessity of an update of the behavior prediction model database based on the deviation occurrence reason when the determination is made by the prediction deviation determination unit that the prediction deviation occurs.

With the behavior prediction device of the aspect of the present disclosure, when determination is made that the prediction deviation between the behavior prediction of the moving object and the detection result of the moving object behavior corresponding to the behavior prediction occurs, the deviation occurrence reason is estimated from the behavior prediction of the moving object and the detection result and the necessity of the update of the behavior prediction model database is determined based on the deviation occurrence reason. Therefore, it is possible to appropriately determine the necessity of the update of the behavior prediction model database compared with when the deviation occurrence reason is not considered.

In the behavior prediction device of the aspect of the present disclosure, when the determination is made by the prediction deviation determination unit that the prediction deviation occurs, the update necessity determination unit may calculate an update necessity degree of the behavior prediction model database based on the deviation occurrence reason and determine that the update of the behavior prediction model database is necessary when the update necessity degree is equal to or larger than an update threshold value.

In the behavior prediction device of the aspect of the present disclosure, the behavior prediction calculation unit may calculate at least a short-term behavior prediction which is the behavior prediction of the moving object at a short-term prediction time point set in advance and a long-term behavior prediction which is the behavior prediction of the moving object at a long-term prediction time point set in advance as a time point after the short-term prediction time point, and when determination is made by the prediction deviation determination unit that the prediction deviation of the short-term behavior prediction occurs in the calculation of the update necessity degree based on the same deviation occurrence reason, the update necessity determination unit may calculate the update necessity degree as a large value compared with when determination is made that the prediction deviation of the short-term behavior prediction does not occur and only the prediction deviation of the long-term behavior prediction occurs.

In the behavior prediction device of the aspect of the present disclosure, a map database that stores map information including position information for each lane and a vehicle position recognition unit configured to recognize a position of the host vehicle on a map may be further included. The behavior prediction model database may store the behavior prediction model in association with the position on the map in the map information, and the behavior prediction calculation unit may calculate the behavior prediction of the moving object based on the detection result of the moving object behavior, the behavior prediction model, the map information, and the position of the host vehicle on the map.

In the behavior prediction device of the aspect of the present disclosure, when the position of the moving object in the behavior prediction is not included in a moving object no entry region on the map and the position of the moving object in the detection result of the moving object behavior corresponding to the behavior prediction is included in the moving object no entry region on the map, the deviation occurrence reason estimation unit may estimate abnormality in the map information as the deviation occurrence reason. When the abnormality in the map information is estimated as the deviation occurrence reason by the deviation occurrence reason estimation unit, the update necessity determination unit may determine that the update of the behavior prediction model database is unnecessary.

In the behavior prediction device of the aspect of the present disclosure, a type recognition unit configured to recognize a type of the moving object may be further included. The behavior prediction model database may store the behavior prediction model in association with the type of the moving object, and the behavior prediction calculation unit may calculate the behavior prediction of the moving object based on the detection result of the moving object behavior, the behavior prediction model, and the type of the moving object.

With the behavior prediction device of the aspect of the present disclosure, it is possible to appropriately determine the necessity of the update of the behavior prediction model database for predicting the behavior of the moving object.

DETAILED DESCRIPTION

Hereinafter, embodiments of the present disclosure will be described with reference to drawings.

First Embodiment

Figure 1:
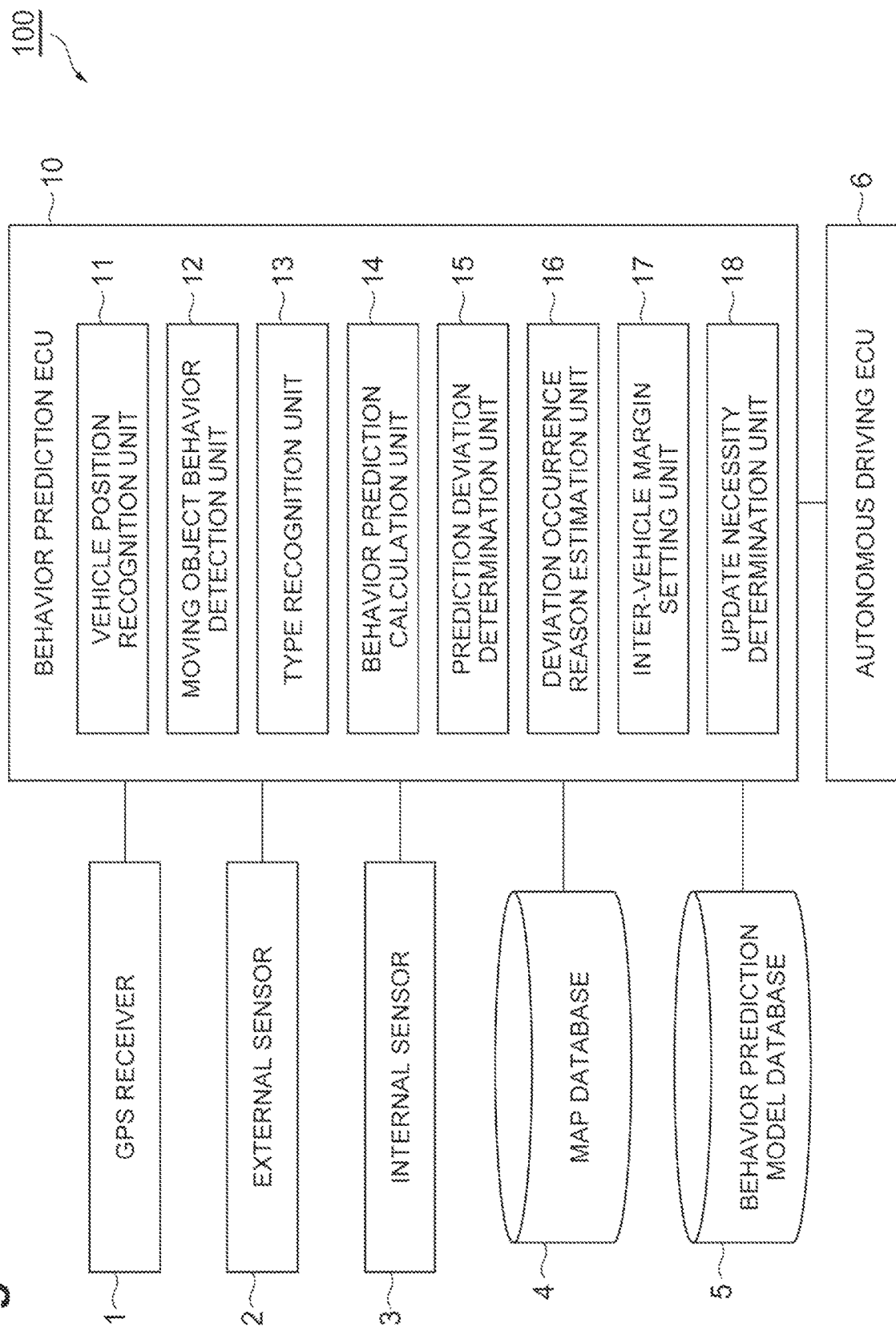
FIG. 1 is a block diagram illustrating a behavior prediction device of a first embodiment.

A behavior prediction device 100 of a first embodiment shown in FIG. 1 is mounted on a vehicle (host vehicle) such as a passenger vehicle and is a device that performs a behavior prediction of a moving object around the host vehicle. The moving object is another vehicle (four-wheel vehicle, two-wheel vehicle, or the like). The moving object may include a pedestrian and a bicycle. The moving object may be limited to objects located on a road.
Configuration of Behavior Prediction Device of First Embodiment As shown in FIG. 1, the behavior prediction device 100 of the first embodiment includes a behavior prediction electronic control unit [ECU] 10. The behavior prediction ECU 10 is an electronic control unit configured to have a central processing unit [CPU], a read only memory [ROM], a random access memory [RAM], a controller area network [CAN] communication circuit, and the like. In the behavior prediction ECU 10, for example, a program stored in the ROM is loaded in the RAM and the CPU executes the program loaded in the RAM to realize various functions. The behavior prediction ECU 10 may be configured of a plurality of electronic units.

The behavior prediction ECU 10 is connected to a GPS receiver 1, an external sensor 2, an internal sensor 3, a map database 4, a behavior prediction model database 5, and an autonomous driving ECU 6. The behavior prediction ECU 10 may be integrated with the autonomous driving ECU 6.

The GPS receiver 1 receives signals from three or more GPS satellites to measure a position of the host vehicle (for example, latitude and longitude of the host vehicle). The GPS receiver 1 transmits the measured position information of the host vehicle to the behavior prediction ECU 10.

The external sensor 2 is a detector that detects a situation around the host vehicle. The external sensor 2 includes at least one of camera or radar sensor.

The camera is an imaging apparatus that images an external situation of the host vehicle. The camera is provided on a back side of a windshield of the host vehicle and images the front of the vehicle. The camera transmits imaging information relating to the external situation of the host vehicle to the behavior prediction ECU 10. The camera may be a monocular camera or a stereo camera.

The radar sensor is the detector that detects an object around the vehicle by using a radio wave (for example, millimeter wave) or light. The radar sensor includes, for example, a millimeter wave radar or a light detection and ranging [LIDAR]. The radar sensor transmits the radio wave or the light to the surroundings of the host vehicle and receives the radio wave or the light reflected from the object to detect the object. The radar sensor transmits the detected object information to the behavior prediction ECU 10. The object includes a fixed object such as a guardrail or a building in addition to the moving object.

The internal sensor 3 is the detector that detects a traveling state of the host vehicle. The internal sensor 3 includes a vehicle speed sensor, an acceleration sensor, and a yaw rate sensor. The vehicle speed sensor is the detector that detects a speed of the host vehicle. For example, a wheel speed sensor that is provided with respect to a wheel of the host vehicle, a drive shaft integrally rotating with the wheels, or the like and detects a rotation speed of the wheel is used as the vehicle speed sensor. The vehicle speed sensor transmits the detected vehicle speed information (wheel speed information) to the behavior prediction ECU 10.

The acceleration sensor is the detector that detects acceleration of the host vehicle. The acceleration sensor includes, for example, a front-rear acceleration sensor that detects the acceleration in the front-rear direction of the host vehicle and a lateral acceleration sensor that detects lateral acceleration of the host vehicle. The acceleration sensor transmits, for example, pieces of acceleration information of the host vehicle to the behavior prediction ECU 10. The yaw rate sensor is the detector that detects a yaw rate (rotation angular velocity) around the vertical axis of the center of gravity of the host vehicle. For example, a gyro sensor may be used as the yaw rate sensor. The yaw rate sensor transmits the detected yaw rate information of the host vehicle to the behavior prediction ECU 10.

The map database 4 is a database that stores map information. The map database 4 is formed inside a hard disk drive [HDD] mounted on the host vehicle. The map information includes the position information of the road, an intersection, a junction, and the like. The map information may include the position information for each lane or curvature information of the road. Further, the map information may include traffic regulation information such as a legal maximum speed associated with a position on the map. The map DATABASE 4 may be formed in a server or the like of a management center capable of communicating with the host vehicle.

The behavior prediction model database 5 is the database that stores a behavior prediction model. The behavior prediction model database 5 is formed, for example, in the hard disk drive [HDD] mounted on the host vehicle. The behavior prediction model is a model for predicting moving object behavior. The moving object behavior includes at least a position, an advancing direction, and a speed of the moving object. A predicted moving object behavior may be behavior based on the map information (position, advancing direction, speed, and the like on map) or relative behavior based on the host vehicle (relative position, relative advancing direction, relative speed, and the like). The behavior prediction model database 5 may be formed in the server or the like of the management center capable of communicating with the host vehicle.

The behavior prediction model may be configured so as to calculate the behavior prediction of the moving object from a detection result of the moving object behavior by the external sensor 2. The behavior prediction model can include a known model indicating motion characteristics of the moving object. The behavior prediction model may include, for example, a known vehicle model indicating the motion characteristics of the vehicle (four-wheel vehicle or two-wheel vehicle). Constraint conditions of various motion parameters may be assigned to the behavior prediction model. The motion parameter is the speed, the rotation angular velocity (yaw rate), or the like. The motion parameter may include the acceleration. The constraint condition of the motion parameter is a speed upper limit, a rotation angular velocity upper limit, or the like.

The behavior prediction model may be stored in association with the position on the map. In the behavior prediction model, the motion characteristics may be changed according to the position on the map such as reducing acceleration characteristics of the vehicle model on an unpaved road. Further, in the behavior prediction model, the constraint condition may be assigned according to the traffic regulation corresponding to the position on the map such as setting of a speed limit according to the legal maximum speed.

The behavior prediction model may be stored in association with a type of the moving object. The type of the moving object is a classification of a category such as the four-wheel vehicle, the two-wheel vehicle, or the pedestrian, the bicycle. The four-wheel vehicle may be classified into a large vehicle such as a bus and a small vehicle such as the passenger vehicle. Further, the type of the moving object may include an animal such as a dog or a cat.

The behavior prediction model can include the four-wheel vehicle model and the two-wheel vehicle model. The behavior prediction model may include a pedestrian model or a bicycle model. In this case, the motion characteristics and/or the constraint condition of each model is different according to the type of the moving object. For example, the moving object can move in the lateral direction in the pedestrian model unlike in the four-wheel vehicle model and the two-wheel vehicle model. In the two-wheel vehicle model, an orientation can be changed with a smaller radius of rotation than the four-wheel vehicle model. The speed upper limit in the pedestrian model is smaller than the four-wheel vehicle model and the two-wheel vehicle model. A known form can be employed for such motion characteristics and constraint condition of each model according to the type of the moving object. Further, the behavior prediction model may be divided according to a relative traffic relationship of the moving object with respect to the host vehicle such as a preceding vehicle model, an oncoming vehicle model, or a following vehicle model.

The behavior prediction model may be created by machine learning. The behavior prediction model is optimized by the machine learning such that an accurate behavior prediction can be output from inputs such as the detection result of the moving object behavior and the situation around the moving object. The situation around the moving object is situations of another moving object existing around the moving object which is a target of the behavior prediction and the host vehicle. The situation around the moving object includes the position and the advancing direction of the other moving object and the position and the advancing direction of the host vehicle. The situation around the moving object may include the acceleration and/or the rotation angular velocity of the other moving object and the acceleration and/or the rotation angular velocity of the host vehicle.

The input to the behavior prediction model may further include the map information. In this case, a position of the moving object with respect to the lane on the map (position of moving object with respect to lane center and/or position of moving object with respect to white line) can be used for the behavior prediction. In this case, the behavior prediction model may be selected according to the position on the map.

The input to the behavior prediction model may further include the type of the moving object. In this case, the behavior prediction model may be selected according to the type of the moving object. The behavior prediction model may be created such that the behavior prediction of the moving object can be output by inputting the detection result of the moving object behavior, the situation around the moving object, the map information, and the type of the moving object as an example. A method of machine learning is not particularly limited. For example, supervised learning using a past detection history of the moving object behavior can be employed.

The autonomous driving ECU 6 is mounted on the host vehicle and is the electronic control unit configured to execute autonomous driving of the host vehicle. The autonomous driving is a vehicle control in which a driver does not perform a driving operation and the host vehicle automatically travels. The autonomous driving ECU 6 may be configured of the plurality of electronic units. Some functions of the autonomous driving ECU 6 may be performed by the server capable of communicating with the host vehicle.

The autonomous driving ECU 6 generates an action plan and a traveling plan along a target route set in advance based on, for example, the position of the host vehicle on the map measured by the GPS receiver 1, the map information of the map database 4, the situation around the host vehicle, a vehicle state (vehicle speed, yaw rate, or the like), and the behavior prediction of the moving object around the host vehicle by the behavior prediction ECU 10. The target route may be set manually by an occupant of the vehicle or may be set automatically by a known navigation system or the autonomous driving ECU 6.

The autonomous driving ECU 6 executes the autonomous driving in accordance with the action plan and the traveling plan. The autonomous driving ECU 6 transmits a control signal to an actuator (engine actuator, steering actuator, brake actuator, or the like) of the vehicle to execute the autonomous driving. The autonomous driving ECU 6 can execute the generation of the action plan and the traveling plan and the autonomous driving by a known method.

Next, a functional configuration of the behavior prediction ECU 10 will be described. The behavior prediction ECU 10 has a vehicle position recognition unit 11, a moving object behavior detection unit 12, a type recognition unit 13, a behavior prediction calculation unit 14, a prediction deviation determination unit 15, a deviation occurrence reason estimation unit 16, an inter-vehicle margin setting unit 17, and an update necessity determination unit 18. Some functions of the behavior prediction ECU 10 described below may be executed by the server or the like of the management center capable of communicating with the host vehicle.

The vehicle position recognition unit 11 recognizes the position of the host vehicle on the map based on the position information of the GPS receiver 1 and the map information of the map database 4. Further, the vehicle position recognition unit 11 may recognize the position of the host vehicle by a simultaneous localization and mapping [SLAM] technique using the position information of a fixed obstacle such as a utility pole included in the map information of the map database 4 and a detection result of the external sensor 2. The vehicle position recognition unit 11 may recognize the advancing direction (orientation) of the host vehicle on the map from a change in the position of the host vehicle on the map.

The moving object behavior detection unit 12 detects the moving object behavior around the host vehicle (for example, behavior of preceding vehicle) based on the detection result of the external sensor 2. The moving object behavior detection unit 12 detects the moving object behavior such as the relative position, the relative advancing direction, and the relative speed of the moving object with respect to the host vehicle from the object information measured by the radar sensor. The moving object behavior detection unit 12 may detect the moving object behavior by image processing of an imaging picture of the camera. Further, the moving object behavior detection unit 12 may detect the moving object behavior based on the map information (position, advancing direction, speed, and the like on the map) by further using the position of the host vehicle on the map and the map information.

The type recognition unit 13 recognizes the type of the moving object based on the detection result of the external sensor 2. The type recognition unit 13 recognizes a shape and a size of the moving object, for example, from the object information measured by the radar sensor and recognizes the type of the moving object by referring to classification data of the type of the moving object stored in advance. The type recognition unit 13 may recognize the type of the moving object by matching of an image pattern or the like from the imaging picture of the camera.

The behavior prediction calculation unit 14 calculates the behavior prediction of the moving object at a prediction time point set in advance. The prediction time point is not particularly limited, and a predetermined time point can be employed. The prediction time point can be one second, two seconds, three seconds, four seconds, five seconds, ten seconds, fifteen seconds, twenty seconds after the current time point as an example. The prediction time point may be only one time point.

When the map information that can be used for the behavior prediction is present, the behavior prediction calculation unit 14 calculates the behavior prediction of the moving object using the map information. The map information that can be used for the behavior prediction is map information including at least position information for each lane.

The behavior prediction calculation unit 14 determines whether the map information that can be used for the behavior prediction is present based on the map information of the map database 4 and the position of the host vehicle on the map recognized by the vehicle position recognition unit 11. For example, when the position information for each lane is included in the map information at the position of the host vehicle on the map, the behavior prediction calculation unit 14 determines that the map information that can be used for the behavior prediction is present. When the position information for each lane is included in the map information at the position of the moving object which is the target of the behavior prediction, the behavior prediction calculation unit 14 may determine that the map information that can be used for the behavior prediction is present further based on the detection result of the moving object behavior by the moving object behavior detection unit 12.

When determination is made that the map information that can be used for the behavior prediction is present, the behavior prediction calculation unit 14 calculates the behavior prediction of the moving object by using the behavior prediction model of the behavior prediction model database 5 based on the map information, the position of the host vehicle on the map, the detection result of the moving object behavior, and the recognition result of the type of the moving object. The detection result of the moving object behavior as the input for the behavior prediction also includes a detection result of the other moving object other than the moving object which is the target of the behavior prediction (moving object or the like located near moving object which is target of behavior prediction).

Specifically, the behavior prediction calculation unit 14 recognizes the position of the moving object with respect to the lane on the map (position of moving object with respect to lane center and/or position of moving object with respect to white line) from the detection result of the moving object behavior, the map information, and the position of the host vehicle on the map. The behavior prediction calculation unit 14 calculates the behavior prediction of the moving object by using the behavior prediction model with the detection result of the moving object behavior, the position of the moving object with respect to the lane on the map, the map information (position information of lane, lane shape, position information of intersection and junction, and the like), and the type of the moving object as the input. The behavior prediction calculation unit 14 calculates the behavior prediction of the moving object using the behavior prediction model according to the type of the moving object recognized by the type recognition unit 13. The behavior prediction calculation unit 14 may further use the vehicle speed, the advancing direction, and the like of the host vehicle as the input for the behavior prediction.

On the other hand, when determination is made that the map information that can be used for the behavior prediction is not present, the behavior prediction calculation unit 14 calculates the behavior prediction of the moving object using the behavior prediction model of the behavior prediction model database 5 based on the detection result of the moving object behavior and the recognition result of the type of the moving object. The behavior prediction calculation unit 14 calculates the behavior prediction of the moving object using the behavior prediction model according to the type of the moving object recognized by the type recognition unit 13.

When the behavior prediction of the moving object is calculated, the behavior prediction calculation unit 14 transmits the result of the behavior prediction to the autonomous driving ECU 6. Specifically, for example, when a behavior prediction in which a preceding vehicle traveling in front of the host vehicle as the moving object turns left at the intersection is performed, the behavior prediction calculation unit 14 transmits the result of the behavior prediction to the autonomous driving ECU 6. The behavior prediction calculation unit 14 transmits also a prediction result of a deceleration amount of the preceding vehicle turning left to the autonomous driving ECU 6. In this case, the autonomous driving ECU 6 increases a distance between the host vehicle during the autonomous driving and the preceding vehicle, and performs the autonomous driving that adjusts the speed of the host vehicle such that a speed change amount of the host vehicle is small even when the preceding vehicle decelerates.

The prediction deviation determination unit 15 determines whether a prediction deviation occurs based on the behavior prediction of the moving object by the behavior prediction calculation unit 14 and the detection result of the moving object behavior corresponding to the behavior prediction. The detection result of the moving object behavior corresponding to the behavior prediction is a result obtained by detecting an actual moving object behavior at the prediction time point of the behavior prediction. The prediction deviation determination unit 15 determines whether the prediction deviation occurs for each prediction time point.

For example, when a position of the moving object in the behavior prediction and a position of the moving object in the detection result of the moving object behavior corresponding to the behavior prediction are separated by a distance threshold value or more, the prediction deviation determination unit 15 determines that the prediction deviation occurs. The distance threshold value is a threshold value set in advance.

When an angle difference in an acute angle formed by an advancing direction of the moving object in the behavior prediction and an advancing direction of the moving object in the detection result of the moving object behavior corresponding to the behavior prediction is equal to or larger than an angle threshold value, the prediction deviation determination unit 15 may determine that the prediction deviation occurs. The angle threshold value is a threshold value set in advance. Further, when a difference in absolute values between a speed of the moving object in a behavior prediction and a speed of the moving object in a detection result of the moving object behavior corresponding to the behavior prediction is equal to or larger than a speed threshold value, the prediction deviation determination unit 15 may determine that the prediction deviation occurs. The speed threshold value is a threshold value set in advance.

The prediction deviation determination unit 15 may determine whether the prediction deviation occurs by comprehensively evaluating the differences between the behavior prediction and the detection result in the position of the moving object, the advancing direction of the moving object, and the speed of the moving object. The prediction deviation determination unit 15 may further determine whether the prediction deviation occurs from a comprehensive evaluation using the acceleration and the rotation angular velocity of the moving object.

When determination is made by the prediction deviation determination unit 15 that the prediction deviation occurs, the deviation occurrence reason estimation unit 16 estimates a deviation occurrence reason based on the behavior prediction of the moving object and the detection result of the moving object behavior corresponding to the behavior prediction. The detection result of the moving object behavior corresponding to the behavior prediction is a detection result of the moving object behavior actually detected by the moving object behavior detection unit 12 at the prediction time point of the behavior prediction. The deviation occurrence reason is a reason for the occurrence of the prediction deviation. The deviation occurrence reason includes insufficient accuracy of the behavior prediction model or the like. The deviation occurrence reason may include behavior abnormality of a moving object to be predicted, abnormality in the map information, or recognition abnormality of the type of the moving object.

The deviation occurrence reason estimation unit 16 estimates the deviation occurrence reason using, for example, a machine learning program that outputs the deviation occurrence reason by inputting the behavior prediction of the moving object and the detection result of the moving object behavior corresponding to the behavior prediction. The deviation occurrence reason estimation unit 16 may estimate the deviation occurrence reason using table data that associates in advance a combination of the behavior prediction of the moving object and the detection result of the moving object behavior corresponding to the behavior prediction with the deviation occurrence reason.

When determination is made that the behavior of the moving object to be predicted is abnormal from the detection result of the moving object behavior, the deviation occurrence reason estimation unit 16 may estimate the behavior abnormality of the moving object to be predicted as the deviation occurrence reason. The behavior abnormality is an abnormal behavior performed by the moving object due to, for example, a failure (run-off of wheel, abnormality in traveling control system, or the like) of the moving object. The behavior abnormality in this case may be a sudden turn, a sudden stop, sudden acceleration, or the like. Further, the behavior abnormality may include meandering driving, sudden acceleration, sudden deceleration, or the like which are not normally predicted due to an appropriate driving operation of the driver of the moving object. The behavior abnormality may include behavior that the moving object to be predicted suddenly approaches the other moving object or a structure (wall, utility pole, or the like), or behavior that the moving object to be predicted suddenly deviates from the lane.

When behavior abnormality that deviates from a normal behavior range set in advance is recognized from the detection result of the moving object behavior to be predicted, the deviation occurrence reason estimation unit 16 may estimate the behavior abnormality of the moving object to be predicted as the deviation occurrence reason. A steering angular velocity range, an acceleration range, a deceleration range, or the like can be set in advance as the normal behavior range. In addition, when it is recognized that the moving object to be predicted performs the behavior of suddenly approaching the other moving object from the detection result of the moving object behavior to be predicted, the deviation occurrence reason estimation unit 16 may estimate the behavior abnormality of the moving object to be predicted as the deviation occurrence reason.

The deviation occurrence reason estimation unit 16 may estimate the recognition abnormality of the type of the moving object as the deviation occurrence reason. The deviation occurrence reason estimation unit 16 changes, for example, the type of the behavior prediction model and calculates again the behavior prediction of the moving object using the detection result of the moving object behavior as an input value used for the behavior prediction. When determination is made that the prediction deviation does not occur between the behavior prediction by the recalculation and the detection result of the moving object behavior corresponding to the behavior prediction, erroneous recognition of the type of the behavior prediction model is considered as the reason of the prediction deviation. Therefore, the deviation occurrence reason estimation unit 16 estimates the recognition abnormality of the type of the moving object as the deviation occurrence reason.

The deviation occurrence reason estimation unit 16 may estimate the deviation occurrence reason using the map information in addition to the behavior prediction of the moving object and the detection result of the moving object behavior corresponding to the behavior prediction. In this case, the deviation occurrence reason estimation unit 16 may set a moving object no entry region from the map information. The moving object no entry region is a region where it is considered that the moving object cannot enter such as on a wall beside the road, in a river, in an ocean. The moving object no entry region may be distinguished for each type of the moving object. When the moving object is the vehicle, the moving object no entry region may include a medial strip, a region of a sidewalk partitioned by a guardrail from a vehicle passing zone. When the moving object is the pedestrian, the moving object no entry region does not include at least the sidewalk. The moving object no entry region may be set in advance for the map information.

When the position of the moving object in the behavior prediction is not included in the moving object no entry region on the map and the position of the moving object in the detection result of the moving object behavior corresponding to the behavior prediction is included in the moving object no entry region on the map, the deviation occurrence reason estimation unit 16 estimates the abnormality in the map information as the deviation occurrence reason. When the position of the moving object such as the vehicle is included in the moving object no entry region such as the river, it is considered that the prediction deviation occurs due to the abnormality in the map information. Therefore, the deviation occurrence reason estimation unit 16 estimates the abnormality in the map information as the deviation occurrence reason.

In addition, when another deviation occurrence reason such as the abnormality in the map information is not estimated, the deviation occurrence reason estimation unit 16 may estimate the insufficient accuracy of the behavior prediction model as the deviation occurrence reason. When the insufficient accuracy of the behavior prediction model is estimated as the deviation occurrence reason, the reason of the prediction deviation may include also the behavior of the moving object in addition to the insufficient accuracy of the behavior prediction model. Therefore, the deviation occurrence reason estimation unit 16 may store a feature (shape or the like) of the moving object. The deviation occurrence reason estimation unit 16 may transmit information relating to the stored moving object to the center. Accordingly, it is possible to gather information relating to a moving object whose behavior prediction by the behavior prediction model does not match (moving object that is difficult to ensure sufficient accuracy of behavior prediction). The behavior prediction calculation unit 14 may perform the behavior prediction for such a moving object using a behavior prediction model different from the last time or may perform a behavior estimation in the related art without using the behavior prediction model.

When the abnormality in the map information is estimated as the deviation occurrence reason, the deviation occurrence reason estimation unit 16 may provide information for update to the map database 4. The deviation occurrence reason estimation unit 16 provides a position or the like of the host vehicle on the map when the abnormality in the map information occurs to the map database 4 as the information for update. The provision of the information for update to the map database 4 is not limited to a meaning of providing information to the map database 4 itself and includes information provision to the server or the electronic control unit that controls the update of the map database 4. When the deviation occurrence reason estimation unit 16 estimates the abnormality in the map information as the deviation occurrence reason, the behavior prediction calculation unit 14 may prohibit the use of the map information for the behavior prediction at the position (and around the position) of the host vehicle on the map where the abnormality in the map information is estimated.

The inter-vehicle margin setting unit 17 sets an inter-vehicle margin in the autonomous driving of the host vehicle. The inter-vehicle margin is a margin of the vehicles between the host vehicle and the preceding vehicle during the autonomous driving. When determination is made by the prediction deviation determination unit 15 that the prediction deviation occurs, the inter-vehicle margin setting unit 17 sets the inter-vehicle margin according to a prediction error. The prediction error is a difference between the behavior prediction of the moving object and the detection result of the moving object behavior corresponding to the behavior prediction.

The prediction error can be calculated based on the same reference as prediction deviation determination in the prediction deviation determination unit 15. That is, when determination is made by the prediction deviation determination unit 15 that the prediction deviation occurs based on a position of the moving object in the behavior prediction and a position of the moving object in the detection result of the moving object behavior corresponding to the behavior prediction, the inter-vehicle margin setting unit 17 calculates a difference (separation distance) between the position of the moving object in the behavior prediction and the position of the moving object in the detection result of the moving object behavior corresponding to the behavior prediction as the prediction error. In addition, the inter-vehicle margin setting unit 17 may calculate the prediction error using an angle difference between an advancing direction of the moving object in a behavior prediction and an advancing direction of the moving object in a detection result of the moving object behavior corresponding to the behavior prediction.

The inter-vehicle margin setting unit 17 sets the inter-vehicle margin as a large value continuously as the prediction error increases. The inter-vehicle margin setting unit 17 may set the inter-vehicle margin step by step. That is, when the prediction error is equal to or larger than a threshold value, the inter-vehicle margin setting unit 17 may set the inter-vehicle margin as the large value compared with when the prediction error is less than the threshold value. The inter-vehicle margin setting unit 17 transmits the set inter-vehicle margin to the autonomous driving ECU 6. The autonomous driving ECU 6 performs the autonomous driving of the host vehicle such that the distance between the host vehicle and the moving object such as the preceding vehicle is equal to or larger than the set inter-vehicle margin.

When there is a situation where the behavior prediction is difficult, the inter-vehicle margin setting unit 17 may set the inter-vehicle margin. The situation where the behavior prediction is difficult is, for example, a situation where a road structure is complicated. The situation where the road structure is complicated includes, for example, a situation where the host vehicle enters an intersection without a traffic signal where turning right or left is possible. The situation where the behavior prediction is difficult may include a situation where there are many pedestrians or a situation where there is a moving object difficult to predict such as the animal.

The inter-vehicle margin setting unit 17 determines whether there is the situation where the behavior prediction is difficult from the map information and the position of the host vehicle on the map, or the detection result of the moving object behavior. When determination is made that there is the situation where the behavior prediction is difficult, the inter-vehicle margin setting unit 17 sets an inter-vehicle margin set in advance. The inter-vehicle margin set in advance may be a fixed value or a value different according to a type of the situation where the behavior prediction is difficult described above. The inter-vehicle margin setting unit 17 transmits the set inter-vehicle margin to the autonomous driving ECU 6.

When determination is made by the prediction deviation determination unit 15 that the prediction deviation occurs, the update necessity determination unit 18 determines the necessity of the update of the behavior prediction model database 5 based on the deviation occurrence reason estimated by the deviation occurrence reason estimation unit 16.

First, the update necessity determination unit 18 calculates an update necessity degree of the behavior prediction model database 5 based on the deviation occurrence reason, the behavior prediction, and the detection result of the moving object behavior corresponding to the behavior prediction. The update necessity determination unit 18 calculates the update necessity degree of the behavior prediction model database 5 using the machine learning program that outputs the update necessity degree by inputting, for example, the behavior prediction, the detection result of the moving object behavior corresponding to the behavior prediction, and the deviation occurrence reason. The update necessity determination unit 18 may calculate the update necessity degree using table data that associates in advance the behavior prediction, the detection result of the moving object behavior corresponding to the behavior prediction, and the deviation occurrence reason with the update necessity degree of the behavior prediction model database 5.

Further, the update necessity determination unit 18 may calculate the update necessity degree to be set as a large value continuously as the prediction error (difference between behavior prediction of moving object and detection result of moving object behavior corresponding to the behavior prediction) described above increases. The update necessity determination unit 18 may calculate such that the update necessity degree is set to a large value step by step. That is, when the prediction error is equal to or larger than a threshold value, the update necessity determination unit 18 may calculate such that the inter-vehicle margin is set to the large value compared with when the prediction error is less than the threshold value.

When the update necessity degree of the behavior prediction model database 5 is equal to or larger than an update threshold value, the update necessity determination unit 18 determines that the update of the behavior prediction model database 5 is necessary. When the update necessity degree of the behavior prediction model database 5 is less than the update threshold value, the update necessity determination unit 18 determines that the update of the behavior prediction model database 5 is unnecessary. The update threshold value is a value set in advance.

The update necessity determination unit 18 may calculate the update necessity degree only from the deviation occurrence reason. The update necessity determination unit 18 calculates the update necessity degree from the deviation occurrence reason using, for example, table data that associates in advance the deviation occurrence reason with the update necessity degree.

When the abnormality in the map information is estimated as the deviation occurrence reason, a possibility that there is the insufficient accuracy in the behavior prediction model is relatively small. Therefore, the update necessity determination unit 18 may set the update necessity degree to zero. Similarly, when the recognition abnormality of the type of the moving object is estimated as the deviation occurrence reason, the possibility that there is insufficient accuracy in the behavior prediction model is relatively small. Therefore, the update necessity determination unit 18 may set the update necessity degree to zero.

When the behavior abnormality of the moving object to be predicted is estimated as the deviation occurrence reason, the update necessity determination unit 18 may set the update necessity degree to zero. Alternatively, since the behavior prediction also corresponding to the behavior abnormality of the moving object is possible, the update necessity determination unit 18 may set the update necessity degree to a large value (value that determines that update of behavior prediction model database 5 described below is necessary). When the insufficient accuracy of the behavior prediction model is estimated as the deviation occurrence reason, the update necessity determination unit 18 may set the update necessity degree to the large value (value that determines that update of behavior prediction model database 5 described below is necessary).

When determination is made that the update of the behavior prediction model database 5 is necessary, the update necessity determination unit 18 provides the information for update to the behavior prediction model database 5. The update necessity determination unit 18 provides, for example, the behavior prediction related to the current determination and the detection result of the moving object behavior corresponding to the behavior prediction to the behavior prediction model database 5 as the information for update. The information for update to the behavior prediction model database 5 may include the deviation occurrence reason or the update necessity degree. The information for update to the behavior prediction model database 5 may include information on the type of the moving object for a moving object not corresponding to the behavior prediction by the behavior prediction model, or may include information on a vehicle type when the moving object is the vehicle. The information for update to the behavior prediction model database 5 may include information on a surrounding environment of the host vehicle when the behavior prediction of the moving object is performed.

The provision of the information for update to the behavior prediction model database 5 is not limited to a meaning of providing information to the behavior prediction model database 5 itself and includes the information provision to the server or the electronic control unit that controls the update of the behavior prediction model database 5.

Further, when determination is made by the update necessity determination unit 18 that the update of the behavior prediction model database 5 is necessary, the behavior prediction calculation unit 14 prohibits the use of a behavior prediction model related to the prediction deviation. The behavior prediction calculation unit 14 does not use the behavior prediction model for the behavior prediction of the moving object, for example, before the behavior prediction model is updated. When the determination is made by the update necessity determination unit 18 that the update of the behavior prediction model database 5 is necessary, the behavior prediction calculation unit 14 does not necessarily need to prohibit the use of the behavior prediction model related to the prediction deviation with single determination, and the behavior prediction calculation unit 14 may prohibit the use of the behavior prediction model when the determination that the update is necessary is performed a predetermined number of times or more.

Process of Behavior Prediction Device of First Embodiment

Next, processes of the behavior prediction device 100 of the first embodiment will be described with reference to drawings.

Behavior Prediction Process

Figure 2:
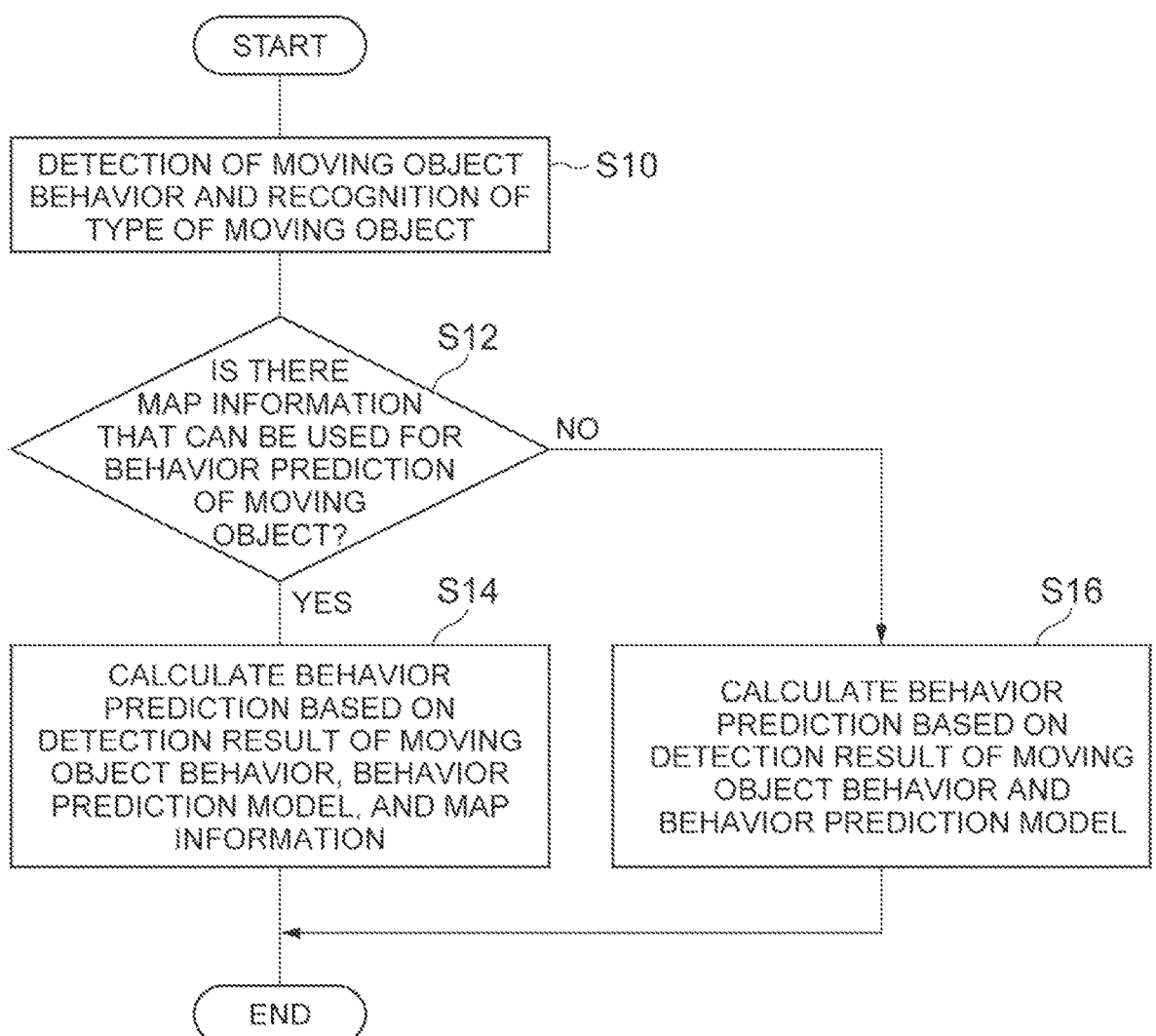
FIG. 2 is a flowchart illustrating an example of a behavior prediction process.

FIG. 2 is a flowchart illustrating an example of a behavior prediction process. The process shown in FIG. 2 is executed, for example, during engine drive of the host vehicle or during the autonomous driving of the host vehicle.

As shown in FIG. 2, the behavior prediction ECU 10 of the behavior prediction device 100 performs the detection of the moving object behavior by the moving object behavior detection unit 12 and the recognition of the type of the moving object by the type recognition unit 13 as S10. The moving object behavior detection unit 12 detects the moving object behavior around the host vehicle based on the detection result of the external sensor 2. The type recognition unit 13 recognizes the type of the moving object based on the detection result of the external sensor 2. Thereafter, the behavior prediction ECU 10 proceeds to S12.

In S12, the behavior prediction ECU 10 determines whether the map information that can be used by the behavior prediction calculation unit 14 for the behavior prediction of the moving object is present. The behavior prediction calculation unit 14 determines whether the map information that can be used for the behavior prediction of the moving object is present based on the map information of the map database 4 and the position of the host vehicle on the map recognized by the vehicle position recognition unit 11. When determination is made that the map information that can be used for the behavior prediction of the moving object is present (S12: YES), the behavior prediction ECU 10 proceeds to S14. When determination is made that the map information that can be used for the behavior prediction of the moving object is not present (S12: NO), the behavior prediction ECU 10 proceeds to S16.

In S14, the behavior prediction ECU 10 performs the behavior prediction of the moving object by the behavior prediction calculation unit 14. In S14, the behavior prediction calculation unit 14 calculates the behavior prediction of the moving object by using the behavior prediction model of the behavior prediction model database 5 based on the map information, the position of the host vehicle on the map, the detection result of the moving object behavior, and the recognition result of the type of the moving object. Thereafter, the behavior prediction ECU 10 ends the present process.

In S16, the behavior prediction ECU 10 performs the behavior prediction of the moving object by the behavior prediction calculation unit 14. In S16, the behavior prediction calculation unit 14 calculates the behavior prediction of the moving object by using the behavior prediction model of the behavior prediction model database 5 based on the position of the host vehicle on the map, the detection result of the moving object behavior, and the recognition result of the type of the moving object, not using the map information. Thereafter, the behavior prediction ECU 10 ends the present process.

Update Necessity Determination Process

Figure 3:
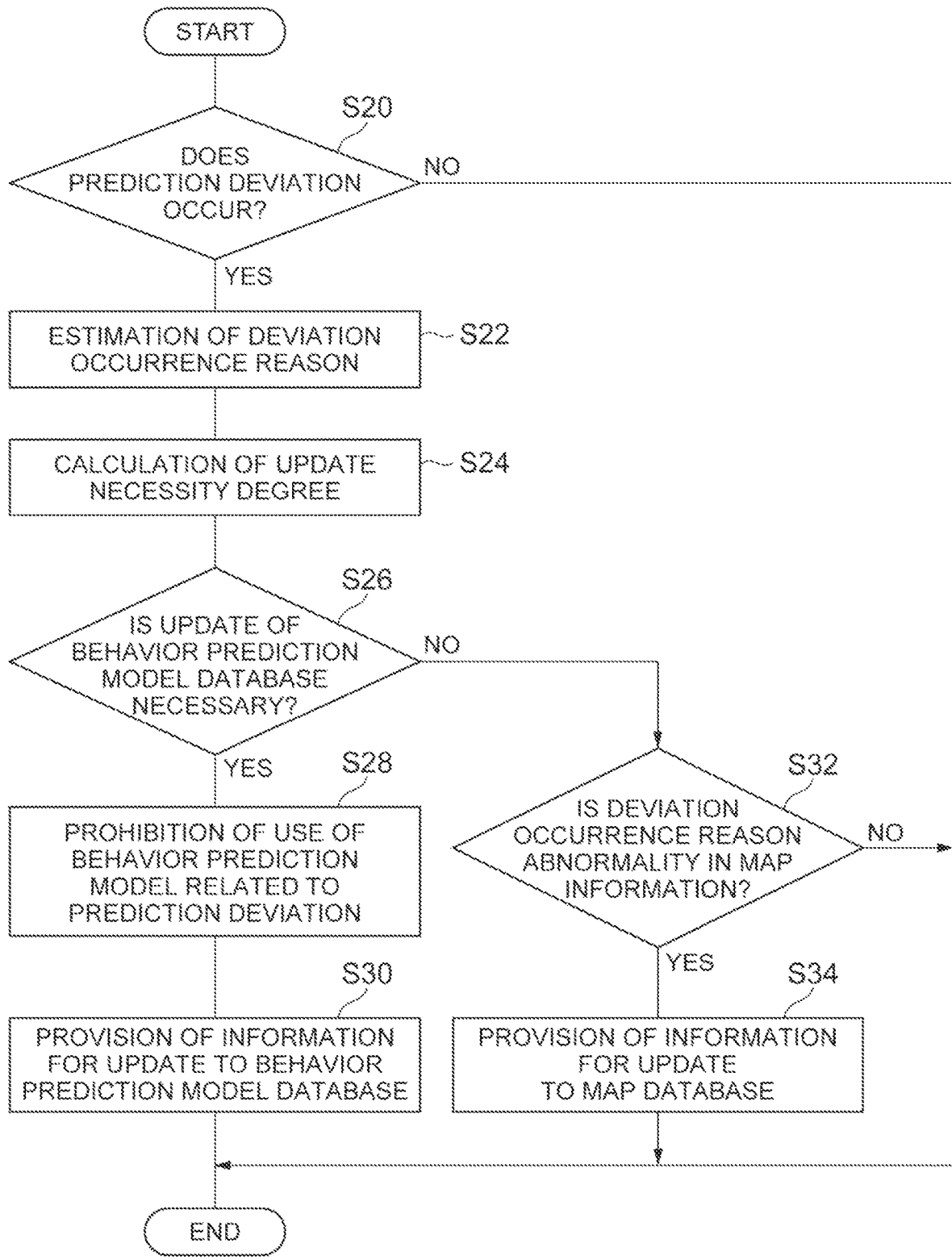
FIG. 3 is a flowchart illustrating an example of an update necessity determination process.

FIG. 3 is a flowchart illustrating an example of an update necessity determination process. The flowchart shown in FIG. 3 is executed every time the behavior prediction shown in FIG. 2 is performed.

As shown in FIG. 3, the behavior prediction ECU 10 determines whether the prediction deviation occurs due to the prediction deviation determination unit 15 as S20. The prediction deviation determination unit 15 determines whether the prediction deviation occurs based on the behavior prediction of the moving object by the behavior prediction calculation unit 14 and the detection result of the moving object behavior corresponding to the behavior prediction. When determination is not made that the prediction deviation occurs (S20: NO), the behavior prediction ECU 10 ends the present process. When determination is made that the prediction deviation occurs (S20: YES), the behavior prediction ECU 10 proceeds to S22.

In S22, the behavior prediction ECU 10 estimates the deviation occurrence reason by the deviation occurrence reason estimation unit 16. The deviation occurrence reason estimation unit 16 estimates the deviation occurrence reason based on the behavior prediction of the moving object, the detection result of the moving object behavior corresponding to the behavior prediction, and the map information. For example, when the position of the moving object in the behavior prediction is not included in the moving object no entry region on the map and the position of the moving object in the detection result of the moving object behavior corresponding to the behavior prediction is included in the moving object no entry region on the map, the deviation occurrence reason estimation unit 16 estimates the abnormality in the map information as the deviation occurrence reason. When the other deviation occurrence reason such as the abnormality in the map information is not estimated, the deviation occurrence reason estimation unit 16 may estimate the insufficient accuracy of the behavior prediction model as the deviation occurrence reason. Thereafter, the behavior prediction ECU 10 proceeds to S24.

In S24, the behavior prediction ECU 10 calculates the update necessity degree of the behavior prediction model database 5 by the update necessity determination unit 18. The update necessity determination unit 18 calculates the update necessity degree based on the deviation occurrence reason, the behavior prediction, and the detection result of the moving object behavior corresponding to the behavior prediction. The update necessity determination unit 18 may calculate the update necessity degree based on only the deviation occurrence reason. Thereafter, the behavior prediction ECU 10 proceeds to S26.

In S26, the behavior prediction ECU 10 determines the necessity of the update of the behavior prediction model database 5 by the update necessity determination unit 18. When the update necessity degree is equal to or larger than the update threshold value, the update necessity determination unit 18 determines that the update of the behavior prediction model database 5 is necessary. When the update necessity degree is less than the update threshold value, the update necessity determination unit 18 determines that the update of the behavior prediction model database 5 is unnecessary. When determination is made that the update of the behavior prediction model database 5 is necessary (S26: YES), the behavior prediction ECU 10 proceeds to S28. When determination is made that the update of the behavior prediction model database 5 is unnecessary (S26: NO), the behavior prediction ECU 10 proceeds to S32.

In S28, the behavior prediction ECU 10 prohibits the use of a behavior prediction model related to the prediction deviation by the behavior prediction calculation unit 14. The behavior prediction calculation unit 14 does not use the behavior prediction model for the behavior prediction of the moving object, for example, before the behavior prediction model is updated. When the use of the behavior prediction model is prohibited, the behavior prediction ECU 10 proceeds to S30.

In S30, the behavior prediction ECU 10 provides the information for update to the behavior prediction model database 5 by the update necessity determination unit 18. The update necessity determination unit 18 provides, for example, the behavior prediction related to the current determination and the detection result of the moving object behavior corresponding to the behavior prediction to the behavior prediction model database 5 as the information for update. Thereafter, the behavior prediction ECU 10 ends the present process.

In S32, the behavior prediction ECU 10 determines whether the deviation occurrence reason is the abnormality in the map information by the deviation occurrence reason estimation unit 16. When determination is made that the deviation occurrence reason is the abnormality in the map information (S32: YES), the behavior prediction ECU 10 proceeds to S34. When determination is made that the deviation occurrence reason is not the abnormality in the map information (S32: NO), the behavior prediction ECU 10 ends the present process.

In S34, the behavior prediction ECU 10 provides the information for update to the map database 4 by the deviation occurrence reason estimation unit 16. The deviation occurrence reason estimation unit 16 provides the position or the like of the host vehicle on the map when the abnormality in the map information occurs to the map database 4 as the information for update. Thereafter, the behavior prediction ECU 10 ends the present process.

Inter-Vehicle Margin Setting Process

Figure 4A:
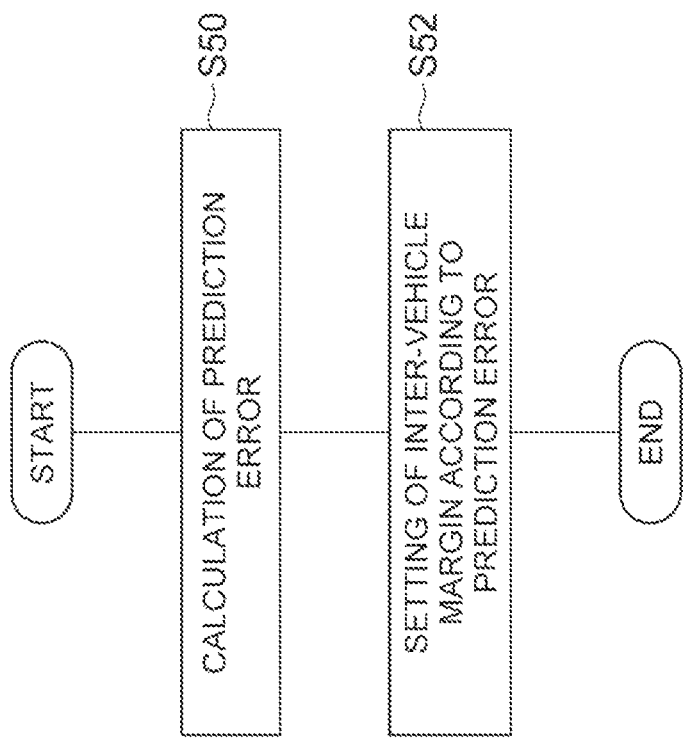
FIG. 4A is a flowchart illustrating an example of an inter-vehicle margin setting process.

FIG. 4A is a flowchart illustrating an example of an inter-vehicle margin setting process. The process of the flowchart shown in FIG. 4A is started at a start time of the autonomous driving of the host vehicle.

As shown in FIG. 4A, the behavior prediction ECU 10 determines whether there is the situation where the behavior prediction is difficult due to the inter-vehicle margin setting unit 17 as S40. For example, when there is the situation where the host vehicle enters the intersection without the traffic signal where turning right or left is possible, the inter-vehicle margin setting unit 17 determines that there is the situation where the behavior prediction is difficult. When determination is not made that there is the situation where the behavior prediction is difficult (S40: NO), the behavior prediction ECU 10 ends the present process. Thereafter, when the host vehicle is in the autonomous driving, the behavior prediction ECU 10 repeats the process from S40 again after a certain time elapses. When determination is made that there is the situation where the behavior prediction is difficult (S40: YES), the behavior prediction ECU 10 proceeds to S42.

In S42, the behavior prediction ECU 10 sets the inter-vehicle margin by the inter-vehicle margin setting unit 17. The inter-vehicle margin setting unit 17 sets, for example, an inter-vehicle margin set in advance according to the type of the situation where the behavior prediction is difficult. The inter-vehicle margin setting unit 17 transmits the set inter-vehicle margin to the autonomous driving ECU 6. Thereafter, when the host vehicle is in the autonomous driving, the behavior prediction ECU 10 repeats the process from S40 again after a certain time elapses.

Figure 4B:
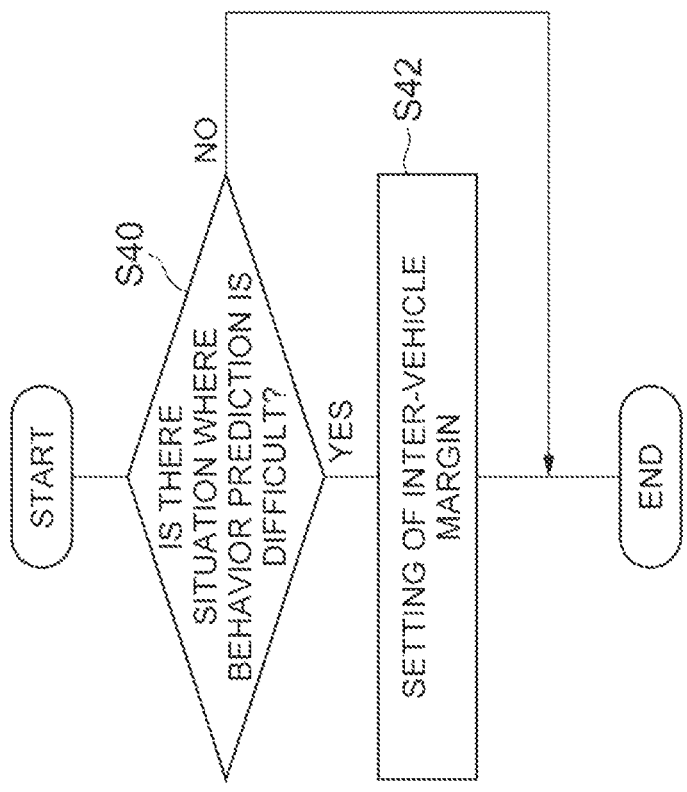
FIG. 4B is a flowchart illustrating another example of the inter-vehicle margin setting process.

FIG. 4B is a flowchart illustrating another example of the inter-vehicle margin setting process. The process of the flowchart shown in FIG. 4B is executed every time determination is made by the prediction deviation determination unit 15 that the prediction deviation occurs during the autonomous driving of the host vehicle.

As shown in FIG. 4B, the behavior prediction ECU 10 calculates the prediction error by the inter-vehicle margin setting unit 17 as S50. The inter-vehicle margin setting unit 17 calculates, for example, the difference (separation distance) between the position of the moving object in the behavior prediction and the position of the moving object in the detection result of the moving object behavior corresponding to the behavior prediction as the prediction error. Thereafter, the behavior prediction ECU 10 proceeds to S52.

In S52, the behavior prediction ECU 10 sets the inter-vehicle margin according to the prediction error by the inter-vehicle margin setting unit 17. The inter-vehicle margin setting unit 17 sets the inter-vehicle margin, for example, as a large value continuously as the prediction error increases. The inter-vehicle margin setting unit 17 transmits the set inter-vehicle margin to the autonomous driving ECU 6. Thereafter, the behavior prediction ECU 10 ends the present process.

With the behavior prediction device 100 of the first embodiment described above, when determination is made that the prediction deviation occurs between the behavior prediction of the moving object and the detection result of the moving object behavior corresponding to the behavior prediction, the deviation occurrence reason is estimated from the behavior prediction of the moving object and the detection result thereof, and the necessity of the update of the behavior prediction model database 5 is determined based on the deviation occurrence reason. Therefore, it is possible to appropriately determine the necessity of the update of the behavior prediction model database 5 compared with when the deviation occurrence reason is not considered.

Further, with the behavior prediction device 100, it is possible to determine the necessity of the update of the behavior prediction model database 5 using the update necessity degree by calculating the update necessity degree of the behavior prediction model database 5 based on the deviation occurrence reason.

Furthermore, with the behavior prediction device 100, since the behavior prediction of the moving object using the behavior prediction model can be calculated in consideration of the map information, it is possible to improve the accuracy of the behavior prediction compared with when the map information is not used. Further, in the behavior prediction device 100, when the position of the moving object in the detection result of the moving object behavior corresponding to the behavior prediction is included in the moving object no entry region even though the position of the moving object in the behavior prediction is not included in the moving object no entry region such as the river, it is considered that the prediction deviation occurs due to the abnormality in the map information. Therefore, the abnormality in the map information can be estimated as the deviation occurrence reason, and the update of the behavior prediction model database 5 can be made unnecessary.

Further, in the behavior prediction device 100, since the behavior prediction of the moving object using the behavior prediction model can be calculated in consideration of the type of the moving object such as the vehicle or the pedestrian, it is possible to improve the accuracy of the behavior prediction compared with when the type of the moving object is not considered.

Second Embodiment

Figure 5:
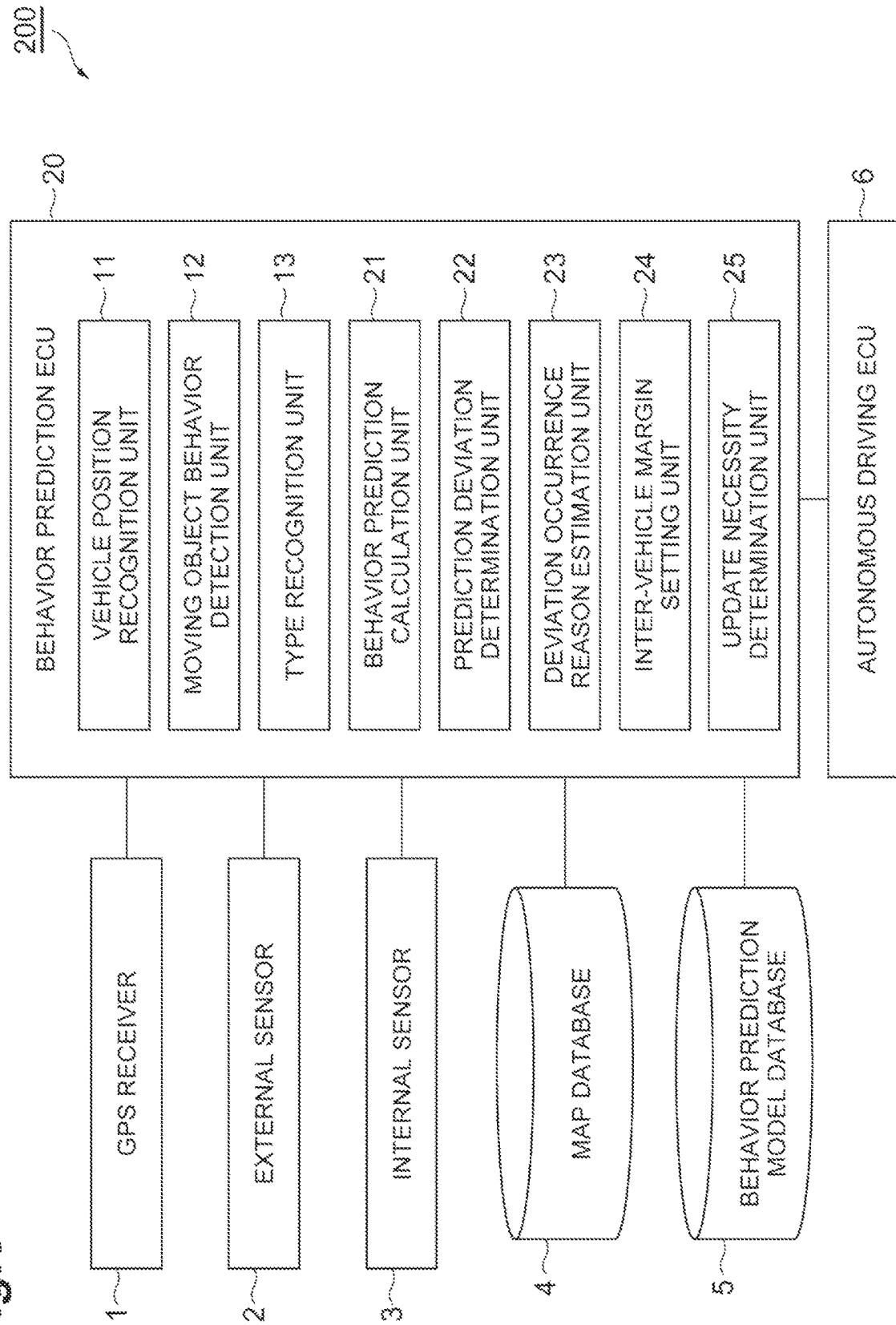
FIG. 5 is a block diagram illustrating a behavior prediction device of a second embodiment.

Next, a behavior prediction device of a second embodiment will be described with reference to drawings. FIG. 5 is a block diagram illustrating the behavior prediction device of the second embodiment. A behavior prediction device 200 of the second embodiment shown in FIG. 5 differs from the first embodiment in that a short-term behavior prediction and a long-term behavior prediction are performed as the behavior prediction and a function of changing processes between in a case of the prediction deviation of the short-term behavior prediction and in a case of the prediction deviation of the long-term behavior prediction is further included.

Configuration of Behavior Prediction Device of Second Embodiment

As shown in FIG. 5, the behavior prediction device 200 of the second embodiment differs from the first embodiment in functions of a behavior prediction calculation unit 21, a prediction deviation determination unit 22, a deviation occurrence reason estimation unit 23, an inter-vehicle margin setting unit 24, and an update necessity determination unit 25.

The behavior prediction calculation unit 21 performs the short-term behavior prediction and the long-term behavior prediction. The short-term behavior prediction is a behavior prediction at a short-term prediction time point (for example, time point within five seconds from the current time point) set in advance. The long-term behavior prediction is a behavior prediction at a long-term prediction time point (for example, time point after five seconds from the current time point) set in advance. The short-term prediction time point is, for example, the time points after one second, two seconds, three seconds, four seconds, and five seconds. The long-term prediction time point is, for example, the time points after ten seconds, fifteen seconds, and twenty seconds from the current time point.

The short-term prediction time point may be a prediction time point before a first reference time point set in advance, and the first reference time point is not necessarily five seconds. The long-term prediction time point also may be a prediction time point after a second reference time point set in advance, and the second reference time point is not necessarily the same as the first reference time point. The second reference time point may be a time point before the first reference time point. In the embodiment, it is assumed that the prediction time point of the behavior prediction is divided into at least one of the short-term prediction time point and the long-term behavior prediction for simplicity of description.

The prediction deviation determination unit 22 determines whether the prediction deviation occurs based on the short-term behavior prediction of the moving object by the behavior prediction calculation unit 21 and the detection result of the moving object behavior corresponding to the short-term behavior prediction. The prediction deviation determination unit 22 determines whether the prediction deviation occurs for each prediction time point. Similarly, the prediction deviation determination unit 22 determines whether the prediction deviation occurs based on the long-term behavior prediction of the moving object by the behavior prediction calculation unit 21 and the detection result of the moving object behavior corresponding to the long-term behavior prediction. The prediction deviation determination unit 22 may set different threshold values (distance threshold value, angle threshold value, and the like) used for the determination of the prediction deviation between the short-term behavior prediction and the long-term behavior prediction.

When determination is made by the prediction deviation determination unit 15 that the prediction deviation occurs in the short-term behavior prediction, the deviation occurrence reason estimation unit 23 estimates the deviation occurrence reason of the short-term behavior prediction based on the short-term behavior prediction of the moving object and the detection result of the moving object behavior corresponding to the short-term behavior prediction. Further, when determination is made by the prediction deviation determination unit 22 that the prediction deviation occurs in the long-term behavior prediction, the deviation occurrence reason estimation unit 23 estimates the deviation occurrence reason of the short-term behavior prediction based on the short-term behavior prediction of the moving object and the detection result of the moving object behavior corresponding to the short-term behavior prediction.

Here, in the short-term behavior prediction, there is a high possibility that the prediction deviation is caused due to the insufficient accuracy of the behavior prediction model, not by an external factor such as the abnormality in the map information. Therefore, when determination is made that the prediction deviation of the short-term behavior prediction occurs, the deviation occurrence reason estimation unit 23 easily estimates that the insufficient accuracy of the behavior prediction model is the deviation occurrence reason compared with when determination is made that the prediction deviation of the long-term behavior prediction occurs. When the determination is made that the prediction deviation of the short-term behavior prediction occurs, the deviation occurrence reason estimation unit 23 may always estimate the insufficient accuracy of the behavior prediction model as the deviation occurrence reason.

On the other hand, when determination is not made that the prediction deviation of the short-term behavior prediction occurs and the determination is made that the prediction deviation of the long-term behavior prediction occurs, there is a high possibility that the prediction deviation is caused due to the external factor such as the abnormality in the map information. Therefore, it is difficult for the deviation occurrence reason estimation unit 23 to estimate that the insufficient accuracy of the behavior prediction model is the deviation occurrence reason compared with when the determination is made that the prediction deviation of the short-term behavior prediction occurs. When the determination is not made that the prediction deviation of the short-term behavior prediction occurs and the determination is made that the prediction deviation of the long-term behavior prediction occurs, the deviation occurrence reason estimation unit 23 may estimate the deviation occurrence reason other than the insufficient accuracy of the behavior prediction model.

When the determination is not made by the prediction deviation determination unit 22 that the prediction deviation of the short-term behavior prediction occurs and the determination is made that the prediction deviation of the long-term behavior prediction occurs (when determination is made that only prediction deviation of long-term behavior prediction occurs), the inter-vehicle margin setting unit 24 sets the inter-vehicle margin set in advance. The inter-vehicle margin setting unit 24 may set the inter-vehicle margin of magnitude according to the prediction error.

Since there is only the prediction deviation at the long-term prediction time point, not at the short-term prediction time point close to the current time point, the inter-vehicle margin setting unit 24 sets the inter-vehicle margin in advance instead of decelerating the host vehicle or the like to reduce an influence of the prediction deviation of the long-term behavior prediction on the autonomous driving.

The inter-vehicle margin setting unit 24 transmits the set inter-vehicle margin to the autonomous driving ECU 6.

In the calculation of the update necessity degree based on the same deviation occurrence reason, the update necessity determination unit 25 calculates the update necessity degree as different values between the prediction deviation of the short-term behavior prediction and the prediction deviation of the long-term behavior prediction. That is, in the calculation of the update necessity degree based on the same deviation occurrence reason, when the determination is made by the prediction deviation determination unit 22 that the prediction deviation of the short-term behavior prediction occurs, the update necessity determination unit 25 calculates the update necessity degree of the behavior prediction model database 5 as a large value compared with when the determination is not made that the prediction deviation of the short-term behavior prediction occurs and the determination is made that only the prediction deviation of the long-term behavior prediction occurs.

Specifically, when the determination is made by the prediction deviation determination unit 22 that the prediction deviation of the short-term behavior prediction occurs, the update necessity determination unit 25 calculates the update necessity degree as a first value. In the calculation of the update necessity degree based on the same deviation occurrence reason, when determination is not made by the prediction deviation determination unit 22 that the prediction deviation of the short-term behavior prediction occurs and the determination is made that only the prediction deviation of the long-term behavior prediction occurs, the update necessity determination unit 25 calculates the update necessity degree as a second value. The second value means a value larger than the first value. In the short-term behavior prediction, there is the high possibility that the prediction deviation is caused due to the insufficient accuracy of the behavior prediction model, not due to the external factor such as the abnormality in the map information. Therefore, the update necessity determination unit 25 calculates the update necessity degree as a large value.

When the determination is made that the prediction deviation of the short-term behavior prediction occurs, an influence such as the sudden approach to the moving object may occur if the traveling plan of the autonomous driving of the host vehicle generated based on the short-term behavior prediction continues. Therefore, the update necessity determination unit 25 may perform a deceleration request to the autonomous driving ECU 6. The autonomous driving ECU 6 decelerates the host vehicle during the autonomous driving.

On the other hand, when determination is made that only the prediction deviation of the long-term behavior prediction occurs, an influence such as an occurrence of approach between the host vehicle and the moving object may occur after ten seconds, twenty seconds, or the like if the traveling plan of the autonomous driving of the host vehicle continues. Therefore, the update necessity determination unit 25 may set the inter-vehicle margin by the inter-vehicle margin setting unit 17 and transmit the set margin to the autonomous driving ECU 6. In this case, when a moving object determined that the prediction deviation occurs is the preceding vehicle or the following vehicle, the update necessity determination unit 25 may transmit a lane change request of the host vehicle to the autonomous driving ECU 6. The autonomous driving ECU 6 performs the autonomous driving of the host vehicle so as to take a distance between the moving object determined that the prediction deviation occurs and the host vehicle, or such that the moving object and the host vehicle are different lanes.

Figure 6:
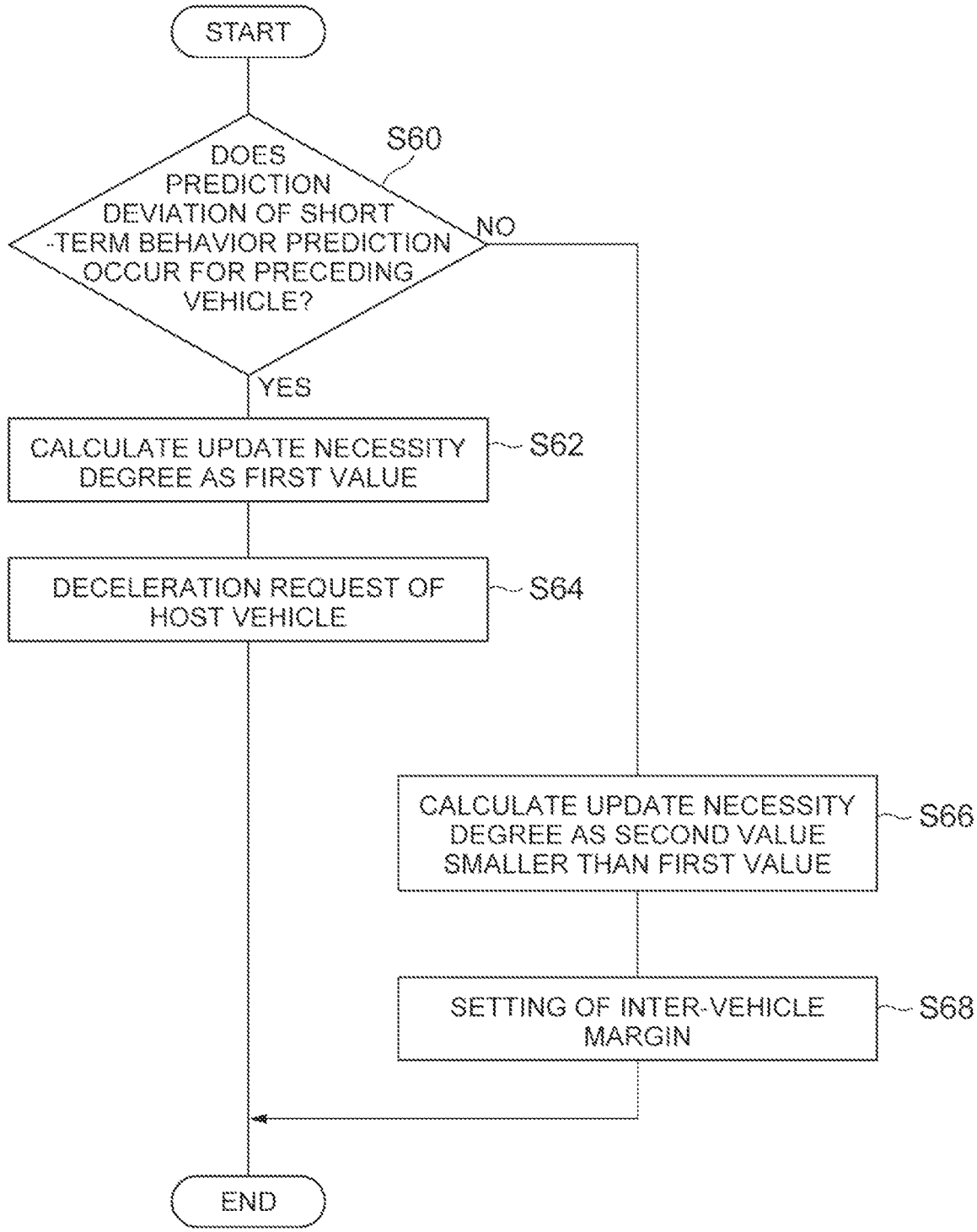
FIG. 6 is a flowchart illustrating an example of an update necessity degree calculation process in the second embodiment.

Update Necessity Degree Calculation Process of Behavior Prediction Device of Second Embodiment Next, an example of an update necessity degree calculation process of the behavior prediction device 200 of the second embodiment will be described with reference to FIG. 6. FIG. 6 is a flowchart illustrating the example of an update necessity degree calculation process in the second embodiment.

The update necessity degree calculation process shown in FIG. 6 corresponds to the process in S24 of the flowchart in FIG. 3 in the first embodiment. That is, the update necessity degree calculation process shown in FIG. 6 is the process after determination is already made that the prediction deviation occurs in S20 of the flowchart in FIG. 3. Other processes of the flowchart in FIG. 3 are the same as those of the first embodiment, and thus the description of other processes is omitted. Here, when the moving object is the preceding vehicle traveling in front of the host vehicle is set as an example, and a request to the autonomous driving ECU 6 of the host vehicle according to a determination result of the prediction deviation is also mentioned.

As shown in FIG. 6, a behavior prediction ECU 20 determines whether the prediction deviation of the short-term behavior prediction of the preceding vehicle occurs due to the prediction deviation determination unit 22 as S60. For example, when a position of the preceding vehicle in the short-term behavior prediction corresponding to one short-term prediction time point and a position of the preceding vehicle detected in the short-term prediction time point (position of detection result of moving object behavior) are separated from each other by a distance threshold value or more, the prediction deviation determination unit 22 determines that the prediction deviation of the short-term behavior prediction of the preceding vehicle occurs.

When determination is made that the prediction deviation of the short-term behavior prediction of the preceding vehicle occurs (S60: YES), the behavior prediction ECU 20 proceeds to S62. When determination is not made that the prediction deviation of the short-term behavior prediction of the preceding vehicle occurs (S60: NO), the behavior prediction ECU 20 proceeds to S66. In this flowchart, when the determination is not made that the prediction deviation of the short-term behavior prediction of the preceding vehicle occurs means when the prediction deviation of the short-term behavior prediction of the preceding vehicle does not occur and the prediction deviation of the long-term behavior prediction thereof occurs.

In S62, the behavior prediction ECU 20 calculates the update necessity degree as the first value by the update necessity determination unit 25. When the determination is made by the prediction deviation determination unit 22 that the prediction deviation of the short-term behavior prediction occurs, the update necessity determination unit 25 calculates the update necessity degree as the first value based on the deviation occurrence reason. The first value may be a value set in advance for each deviation occurrence reason. Thereafter, the behavior prediction ECU 20 proceeds to S64.

In S64, the behavior prediction ECU 20 performs the deceleration request of the host vehicle by the update necessity determination unit 25. Since the influence such as the sudden approach of the host vehicle and the moving object may occur due to the prediction deviation of the short-term behavior prediction, the update necessity determination unit 25 performs the deceleration request to the autonomous driving ECU 6. Thereafter, the behavior prediction ECU 20 ends the present process.

In S66, the behavior prediction ECU 20 calculates the update necessity degree as the second value by the update necessity determination unit 25. That is, when the prediction deviation of the short-term behavior prediction of the preceding vehicle does not occur and the prediction deviation of the long-term behavior prediction thereof occurs, the update necessity determination unit 25 calculates the update necessity degree as the second value based on the deviation occurrence reason. The second value is a value larger than the first value when the deviation occurrence reason is the same. The second value may be a value set in advance for each deviation occurrence reason. Thereafter, the behavior prediction ECU 20 proceeds to S68.

In S68, the behavior prediction ECU 20 sets the inter-vehicle margin by the inter-vehicle margin setting unit 24. The inter-vehicle margin setting unit 24 transmits the set inter-vehicle margin to the autonomous driving ECU 6. Thereafter, the behavior prediction ECU 20 ends the present process. The processes in S64 and S68 in the flowchart shown in FIG. 6 are not necessarily performed.

With the behavior prediction device 200 of the second embodiment described above, the possibility that the prediction deviation occurs due to the influence other than the behavior prediction model increases as the prediction time point of the behavior prediction is earlier. Therefore, when the determination is made that the prediction deviation of the short-term behavior prediction occurs, it is possible to appropriately determine the necessity of the update of the behavior prediction model database 5 by setting the update necessity degree of the behavior prediction model database 5 to the large value larger compared with when the determination is made that the prediction deviation of the long-term behavior prediction occurs.

As described above, the preferable embodiments of the present disclosure are described, but the present disclosure is not limited to the embodiments described above. The present disclosure can be implemented in various forms subjected to various changes and improvements based on the knowledge of those skilled in the art including the embodiments described above.

The behavior prediction devices 100 and 200 may be a part of an autonomous driving system. In this case, the behavior prediction ECUs 10 and 20 may be integral with the autonomous driving ECU 6.

On the other hand, the behavior prediction devices 100 and 200 are not necessarily connected to the autonomous driving ECU 6. A use method of the results of the behavior predictions of the behavior prediction devices 100 and 200 is not particularly limited. The behavior prediction devices 100 and 200 may be connected to a driving assistance ECU that performs a driving assistance control such as an alert of the moving object with respect to the driver.

The behavior prediction devices 100 and 200 do not necessarily need to use the map information for the behavior prediction of the moving object. In this case, the map information is not used also for the estimation of the deviation occurrence reason, and the map database 4 is not indispensable.

When the behavior abnormality of the moving object to be predicted is estimated as the deviation occurrence reason by the deviation occurrence reason estimation units 16 and 23, the behavior prediction devices 100 and 200 may store the feature information (shape, tracking result, and the like). Similarly, even when the insufficient accuracy of the behavior prediction model is estimated as the deviation occurrence reason by the deviation occurrence reason estimation units 16 and 23, it is considered that there is also an influence of compatibility between the behavior prediction model and the moving object (compatibility with moving object or the like that is not good at behavior prediction by behavior prediction model) in addition to the insufficient accuracy of the behavior prediction model. Therefore, the behavior prediction devices 100 and 200 may store the feature information of the moving object.

In this case, the behavior prediction calculation units 14 and 21 may perform the behavior prediction by another method such as a behavior prediction performed by changing the behavior prediction model, a conventional behavior prediction that does not use the behavior prediction model, or the like for the moving object storing the feature information. The behavior prediction calculation units 14 and 21 may shorten an interval of the prediction time point of the behavior prediction (for example, perform behavior prediction at 0.5 second intervals instead of behavior prediction at one second intervals). In addition, the behavior prediction devices 100 and 200 may transmit the feature information of the moving object to the center.

Further, the behavior prediction devices 100 and 200 request the autonomous driving ECU 6 to control the vehicle such that the host vehicle during the autonomous driving is separated from the moving object storing the feature information. The behavior prediction devices 100 and 200 may request the autonomous driving ECU 6 to set the inter-vehicle margin or perform the lane change. The autonomous driving ECU 6 performs the adjustment of an inter-vehicle distance or the lane change such that the host vehicle is separated from the moving object.

Further, the behavior prediction devices 100 and 200 do not necessarily need to use the type of the moving object for the behavior prediction of the moving object. In this case, the behavior prediction ECUs 10 and 20 do not necessarily have the type recognition unit 13. The behavior prediction devices 100 and 200 do not necessarily need to set the inter-vehicle margin. In this case, the inter-vehicle margin setting units 17 and 24 are unnecessary.

Further, the behavior prediction devices 100 and 200 do not necessarily need to calculate the update necessity degree. The behavior prediction devices 100 and 200 may determine the necessity of the update of the behavior prediction model database 5 directly from the deviation occurrence reason. When the deviation occurrence reason is the insufficient accuracy of the behavior prediction model, the update necessity determination units 18 and 25 may determine that the update of the behavior prediction model database 5 is necessary. When the deviation occurrence reason is the abnormality in the map information or the recognition abnormality of the type of the moving object, the update necessity determination units 18 and 25 may determine that the update of the behavior prediction model database 5 is unnecessary. Similarly, when the deviation occurrence reason is the behavior abnormality of the moving object to be predicted, the update necessity determination units 18 and 25 may also determine that the update of the behavior prediction model database 5 is unnecessary.

In addition, when the prediction deviation of the behavior prediction of the moving object does not occur, the behavior prediction devices 100 and 200 may perform the abnormality determination for the action plan and/or the traveling plan of the autonomous driving. In the action plan of the autonomous driving, when there is a change from an action plan ahead of a certain time and the changed action plan does not match the action plan, it can be determined that there is abnormality in the action plan. In the traveling plan of the autonomous driving, when the driver interrupts the autonomous driving, it can be determined that there is abnormality in the traveling plan. The behavior prediction devices 100 and 200 notify the driver of the abnormality determination results.

Further, the behavior prediction devices 100 and 200 may detect abnormality in object tracking logic. Even when determination is made that the prediction deviation of the behavior prediction of the moving object occurs, the behavior prediction devices 100 and 200 may determine that the update of the behavior prediction model database 5 is unnecessary when the abnormality in the object tracking logic is detected. The behavior prediction devices 100 and 200 notify the driver of the abnormality in the object tracking logic. When the moving object around the host vehicle is lost due to the abnormality in the object tracking logic during the autonomous driving of the host vehicle (for example, when preceding vehicle is lost in spite of a straight road), the behavior prediction devices 100 and 200 may request the driver to switch to manual driving (handover).

What is claimed is:

1. A behavior prediction device comprising:
   a map database that stores map information;
   a behavior prediction model database that stores a behavior prediction model for predicting moving object behavior;
   a memory storing one or more instructions;
   a processor configured to execute the one or more instructions to:
     recognize a position of a host vehicle on a map;
     detect moving object behavior including at least a position, an advancing direction, and a speed of a moving object around the host vehicle;
     calculate a behavior prediction of the moving object at a future time point using the behavior prediction model based on the detected moving object behavior and the map information;
     determine whether a prediction deviation occurs based on the behavior prediction at the future time point and the detected moving object behavior at the future time point;
     estimate a deviation occurrence reason based on the behavior prediction, the map information, and the detected moving object behavior corresponding to the behavior prediction when the processor determines that the prediction deviation occurs;
     determine a necessity of an update of the behavior prediction model database based on the deviation occurrence reason when the processor determines that the prediction deviation occurs;
     update the behavior prediction model based on a determination that the update of the behavior prediction model is necessary; and
     autonomously control the host vehicle based on the behavior prediction,
   wherein the deviation occurrence reason comprises an abnormality in the map information, and
   wherein the processor is further configured to determine that the update of the behavior prediction model database is not necessary and prohibits use of the map information for the behavior prediction in an area around the position of the host vehicle on the map, based on an estimation that the abnormality in the map information is the deviation occurrence reason.

2. The behavior prediction device according to claim 1, wherein based on the processor determining that the prediction deviation occurs, the processor is further configured to calculate an update necessity degree of the behavior prediction model database based on the deviation occurrence reason and determine that the update of the behavior prediction model database is necessary when the update necessity degree is equal to or larger than an update threshold value.

3. The behavior prediction device according to claim 2, wherein the processor is further configured to calculate at least a short-term behavior prediction which is the behavior prediction of the moving object at a short-term prediction time point set in advance and a long-term behavior prediction which is the behavior prediction of the moving object at a long-term prediction time point set in advance as a time point after the short-term prediction time point, and
wherein based on the processor determining that the prediction deviation of the short-term behavior prediction occurs in the calculation of the update necessity degree based on the same deviation occurrence reason, the processor is further configured to calculate the update necessity degree as a large value compared with when a determination is made that the prediction deviation of the short-term behavior prediction does not occur and only the prediction deviation of the long-term behavior prediction occurs.

4. The behavior prediction device according to claim 3, wherein the map information comprises position information for each lane,
wherein the processor is further configured to:
    calculate the behavior prediction of the moving object based on the detection result of the moving object behavior, the behavior prediction model, the map information, and the position of the host vehicle on the map, and
wherein the behavior prediction model database is configured to store the behavior prediction model in association with the position on the map in the map information.

5. The behavior prediction device according to claim 4, wherein based on the position of the moving object in the behavior prediction not being included in a moving object no entry region on the map and the position of the moving object in the detection result of the moving object behavior corresponding to the behavior prediction being included in the moving object no entry region on the map, the processor is further configured to estimate the abnormality in the map information as the deviation occurrence reason.

6. The behavior prediction device according to claim 5, wherein the processor is further configured to:
    recognize a type of the moving object; and
    calculate the behavior prediction of the moving object based on the detection result of the moving object behavior, the behavior prediction model, and the type of the moving object,
wherein the behavior prediction model database is configured to store the behavior prediction model in association with the type of the moving object.

7. The behavior prediction device according to claim 4, wherein the processor is further configured to:
    recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

8. The behavior prediction device according to claim 3, wherein the processor is further configured to:

recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

9. The behavior prediction device according to claim 2, wherein the map information comprises position information for each lane, wherein the processor is further configured to:

calculate the behavior prediction of the moving object based on the detection result of the moving object behavior, the behavior prediction model, the map information, and the position of the host vehicle on the map, and wherein the behavior prediction model database is configured to store the behavior prediction model in association with the position on the map in the map information.

10. The behavior prediction device according to claim 9, wherein based on the position of the moving object in the behavior prediction not being included in a moving object no entry region on the map and the position of the moving object in the detection result of the moving object behavior corresponding to the behavior prediction being included in the moving object no entry region on the map, the processor is further configured to estimate the abnormality in the map information as the deviation occurrence reason.

11. The behavior prediction device according to claim 10, wherein the processor is further configured to:

recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

12. The behavior prediction device according to claim 9, wherein the processor is further configured to:

recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

13. The behavior prediction device according to claim 2, wherein the processor is further configured to:

recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

14. The behavior prediction device according to claim 1, wherein the map information comprises position information for each lane;

wherein the processor is further configured to:

calculate the behavior prediction of the moving object based on the detection result of the moving object behavior, the behavior prediction model, the map information, and the position of the host vehicle on the map, and wherein the behavior prediction model database is configured to store the behavior prediction model in association with the position on the map in the map information.

15. The behavior prediction device according to claim 14, wherein based on the position of the moving object in the behavior prediction not being included in a moving object no entry region on the map and the position of the moving object in the detection result of the moving object behavior corresponding to the behavior prediction being included in the moving object no entry region on the map, the processor is further configured to estimate the abnormality in the map information as the deviation occurrence reason.

16. The behavior prediction device according to claim 15, wherein the processor is further configured to:

recognize a type of the moving object and calculate the behavior prediction of the moving object based on the detection result of the moving object behavior, the behavior prediction model, and the type of the moving object, wherein the behavior prediction model database is configured to store the behavior prediction model in association with the type of the moving object.

17. The behavior prediction device according to claim 14, wherein the processor is further configured to:

recognize a type of the moving object; and calculate the behavior prediction of the moving object based on the detection result of the moving object behavior, the behavior prediction model, and the type of the moving object, wherein the behavior prediction model database is configured to store the behavior prediction model in association with the type of the moving object.

18. The behavior prediction device according to claim 1, wherein the processor is further configured to:

recognize a type of the moving object; and calculate the behavior prediction of the moving object based on the detection result of the moving object behavior, the behavior prediction model, and the type of the moving object, wherein the behavior prediction model database stores the behavior prediction model in association with the type of the moving object.

\* \* \* \* \*